(12) United States Patent
Rotsztein et al.

(10) Patent No.: US 9,084,097 B2
(45) Date of Patent: Jul. 14, 2015

(54) INTERACTIVE DISPLAY RESPONSE SYSTEM

(71) Applicant: CallVU LTD., Yokneam (IL)

(72) Inventors: Doron Rotsztein, Netanya (IL); Ran Faran, Tel Aviv (IL)

(73) Assignee: CallVU LTD., Yokneam (IL)

( * ) Notice: Subject to any disclaimer, the term of this patent is extended or adjusted under 35 U.S.C. 154(b) by 222 days.

(21) Appl. No.: 13/681,092

(22) Filed: Nov. 19, 2012

(65) Prior Publication Data

US 2013/0078970 A1 Mar. 28, 2013

Related U.S. Application Data

(63) Continuation of application No. 12/831,740, filed on Jul. 7, 2010, now Pat. No. 8,340,255.

(60) Provisional application No. 61/223,633, filed on Jul. 7, 2009.

(51) Int. Cl.
*H04M 11/00* (2006.01)
*H04W 4/16* (2009.01)
*H04M 3/51* (2006.01)
*H04M 3/493* (2006.01)

(52) U.S. Cl.
CPC .............. *H04W 4/16* (2013.01); *H04M 3/5191* (2013.01); *H04M 3/4936* (2013.01); *H04M 2203/251* (2013.01)

(58) Field of Classification Search
CPC ............ H04M 3/5183; H04M 3/5191; H04M 2201/42; H04M 3/493
USPC ................. 455/403, 412.1, 412.2; 379/265.1, 379/265.11, 266.01, 93.17, 88.18, 88.01; 709/201, 202
See application file for complete search history.

(56) References Cited

U.S. PATENT DOCUMENTS

| 6,064,730 | A  | * | 5/2000 | Ginsberg ................. 379/265.09 |
| 6,272,216 | B1 | * | 8/2001 | Vaios ....................... 379/265.01 |
| 7,054,939 | B2 |   | 5/2006 | Koch et al. |
| 7,668,171 | B2 |   | 2/2010 | Bondarenko et al. |
| 2009/0209239 | A1 |   | 8/2009 | Montesdeoca |

* cited by examiner

*Primary Examiner* — Sonny Trinh
(74) *Attorney, Agent, or Firm* — M&B IP Analysts, LLC

(57) ABSTRACT

An interactive display response (IDR) system. The IDR system comprises an interactive display server (IDS) for communicating display requests from a call center to a plurality of mobile devices that established a connection with the call center; an interactive display agent (IDA) installed on each of the plurality of mobile devices for at least displaying the display requests received from the IDS and communicating user's selections to the call center responsive to the display requests; and an IDR interface for interfacing with interactive voice response (IVR) scripts carried out by the call center and generating display requests based on the IVR scripts.

18 Claims, 9 Drawing Sheets

INTERACTIVE DISPLAY RESPONSE SYSTEM

CROSS-REFERENCE TO RELATED APPLICATIONS

This application is a continuation of U.S. patent application Ser. No. 12/831,740, filed on Jul. 7, 2010 and now allowed, which claims the benefit of U.S. provisional application No. 61/223,633 filed on Jul. 7, 2009, the contents of which are herein incorporated by reference.

TECHNICAL FIELD

This invention generally relates to call centers, and more particularly for enabling interactive display response (IDR) with call centers.

BACKGROUND

One of the challenges facing companies, organizations, and enterprises today is to present their customers with access to information without exploiting their resources. With this aim, call center systems have been utilized to communicate with customers. A call center is a centralized office used for the purpose of receiving and transmitting a large volume of requests. Typically, call centers are based on interactive voice response (IVR) systems that provide information and/or call routing by leading a user through a series of menu-driven voice prompts.

Other means to serve requests from customers are web sites that can be accessed through personal computers (PCs) or mobile devices. However, customers often choose to call the company for service with the intent of talking to an agent or interacting with the company via phone.

IVR systems are commonly used for automating customer service call routing and automated account information (e.g., bank account information). Users of such systems often experience problems navigating through the menu. Thus, frustrated users often abandon their quest for information and terminate the telephone call, prior to reaching the sought information. When users abandon the automated information delivery system, they typically seek a human attendant to connect with to obtain the information originally sought. This increases the demand for human agents in call centers, thereby increasing the cost of operating an automated information delivery system.

In addition, as users are required to traverse a menu tree, it is common that users become frustrated with menu-driven information delivery systems and resort to contacting a human operator. Typically, menu-driven information delivery systems do not enable the user to navigate directly to the desired information and/or service, but rather require the user to traverse a predefined path through the menu tree to the user's objective.

Further, IVR systems are not designated to provide service to disabled people, for example, as defined in Section 255 of the US Federal Law—Telecommunications Access for People with Disabilities. That is, IVR systems are not accessible by the hearing impaired and the dynamically heard menus and prompts, presented by the IVR systems, do not serve as an appropriate solution for people suffering from attention deficit disorder (ADD)/attention deficit—hyperactivity disorder (ADHD) with severe concentration difficulties.

Therefore, it would be advantageous to provide a solution that overcomes the deficiencies of IVR systems to improve the experience of customers interacting with call centers.

SUMMARY

Certain embodiments disclosed herein include an interactive display response (IDR) system. The system comprises an interactive display server (IDS) for communicating display requests from a call center to a plurality of mobile devices attempting to establish a connection with the call center, wherein the display requests are generated respective of one of the call flows implemented by the call center; and a unified display response (UDR) for generating unified graphical displays respective of the display requests.

Certain embodiments disclosed herein further include a method for providing interactive display response (IDR) services. The method comprises establishing a voice session between a mobile device and a call center; establishing a data session between the mobile device and an interactive display server (IDS), wherein the IDS communicates with the call center via an IDR interface; generating display requests based on a call flow of a call center and top selections of a user of the mobile device; and sending the display requests to the mobile device over the data session to allow the display of the display requests one mobile device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
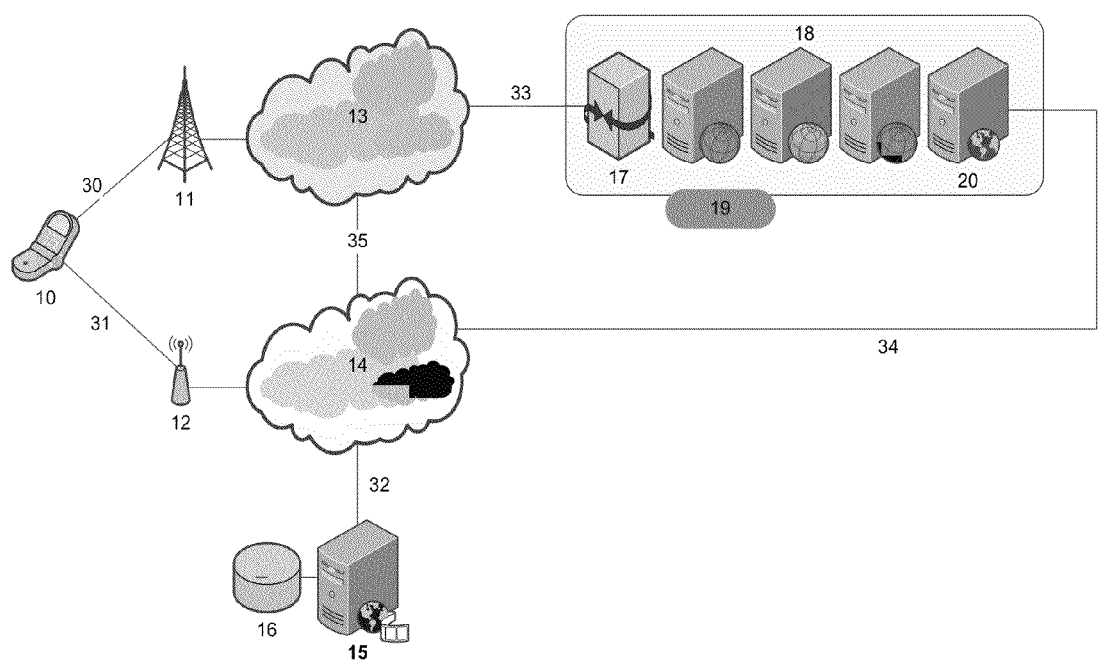
FIG. 1 is a diagram network for deploying an interactive display response (IDR) system in accordance with an embodiment of the invention.

The embodiments disclosed by herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting diagram of a network for deploying an interactive display response (IDR) system in accordance with an embodiment of the invention. According to this embodiment, a voice call to the call center 18, triggers the call center's IVR and the IDR flows in parallel. That is, voice prompts during a call are fully synchronized with the IDR displayed menu. Any changes in the flow caused by a selection made in the IVR menu causes a change in the IDR displayed menu and vice versa.

The IDR system is realized through an interactive display agent (IDA) 10, an interactive display server (IDS) 15, and an IDR API 19 that provides an interface to servers of a call/contact center 18. The IDA 10 is installed on the mobile device. In accordance with certain embodiments of the invention, the IDA may be downloaded from mobile application stores, sent to the mobile device using a distribution mechanism, such as the Over-The-Air (OTA), manually installed, or be embedded in the device. The IDA 10 is activated once a telephone call is placed with a gateway 17 of the call center 18 through one or more of networks 11, 12, 13, and 14. These networks include, but are not limited to, cellular networks, Internet protocol (IP) networks, local area networks (LAN), public switched telephone networks (PSTN), or combination thereof.

The IDS 15 further receives on-line display requests on an inter process communication channel (IPC) 34 from a web service gateway 20 included in the call center 18 via one or more of networks 11-14. The requests are generated by the call center's IVR scripts (that act as a logic engine and state machine). The IVR scripts include a set of commands directed towards the IDS 15, such commands encapsulate the display requests. For example, the commands may include the screen to be presented in each stage during the call flow. The IDS 15 forwards the received requests to the IDA 10 through one or more of networks 11-14. In response, the IDA 10 submits DTMF or messages over the IPC back to the IDR API 19 per user's decision.

It should be noted that the IDA 10 utilizes the mobile device's capabilities (e.g., graphics, touch screen) to allow a wide graphic display and touch screen interaction. The IDA 10 generates menus containing plain text or GUI containing Flash or video depending on the device's capabilities executing the IDA 10. Specifically, the IDS 15 accepts from IDR API 19 messages and display parameters that are common to all types of mobile devices. The IDA 10 or the IDS 15 translates the display parameters and adjusts the device display according to this translation. The IDA 10 knows the mobile device's operating system, display area, screen size, and screen type and generates the display accordingly. Details regarding the IDA host (technical or personal) may or may not be transferred to the IDS 15.

The IDR API 19 allows integration of a call-center's call flow and existing IVR scripts to visually display script prompts and information on mobile devices by means of the IDA 10. A script is a call center automated customer interaction mechanism. In accordance with an embodiment of the invention, the IDR API is platform independent and may have the format of including, but not limited to, XML and/or web service calls. The IDS 15 facilitates the communication between the IDA 10 and IDR API 19. The IDS 15 acts as a registrar for mobile devices executing IDAs. Registered devices are saved in a database 16 coupled to the IDS 15.

The IDA 10, IDR API 19, and IDS 15 communicate with each other using a communication protocol, such as SOAP. In accordance with certain embodiments of the invention, messages exchanged between these components are formed as interactive display language (IDL). The IDL is an XML format for specifying interactive display dialogues between a mobile device and a server. The IDL is populated by the IDR API 19 based on an IVR script by the IDS 15. The IDA 10 parses the IDL according a set of rules, and modifies the mobile device's display accordingly. The IDL includes tags that instruct the IDA to display different sets of controls, such as menus and informational text, quick launch controls, and displayed banners. The IDL also includes tags that define the type of user, for special data concerning the user preferences, and specific setting of an IDA 10.

In accordance with an embodiment of the invention, the IDA 10 and IDS 15 can communicate with any call center and are not tailored to specific centers. That is, a user's mobile device runs a single IDA 10 that allows it to receive IDR services from different call centers via a single IDS 15.

In the embodiment illustrated in FIG. 1, the interactive display response is realized by the following flow. The call center 18 runs an IVR script prompting the user to enter his selections. The IDR API 19 interfaces with the call center 18 and generates requests based on the script. For example, if the IVR script reaches a state informing the user to enter his account number, the IDR API 19 generates a request conveying the same message. Requests from the IDR API 19 are sent the IDS 15 through IPC 32 and 24. The IDS 15 processes the requests and sends them to the IDA 10 via connections 32 and 31 or connections 32, 25, and 30 depending on the connectivity between the mobile device executing the IDA 10 and the IDS 15. The IDA 10 processes each received request and displays the message included therein. The IDA 10 further captures the user's input responsive to the display message and sends the input (user's selection), to the IDR API 19 via connections 30 and 33. The user's selections are sent to the call center using Dual-tone multi-frequency signaling (DTMF). In accordance with another embodiment, users can communicate their selections and/or provide other inputs to the call center by sending messages through the IDS 15. The messages may be in formats including, but not limited to, short message service (SMS) messages, email messages, multimedia messaging service (MMS) messages, images, video clips, audio clips, any combination thereof, and the like.

Figure 2:
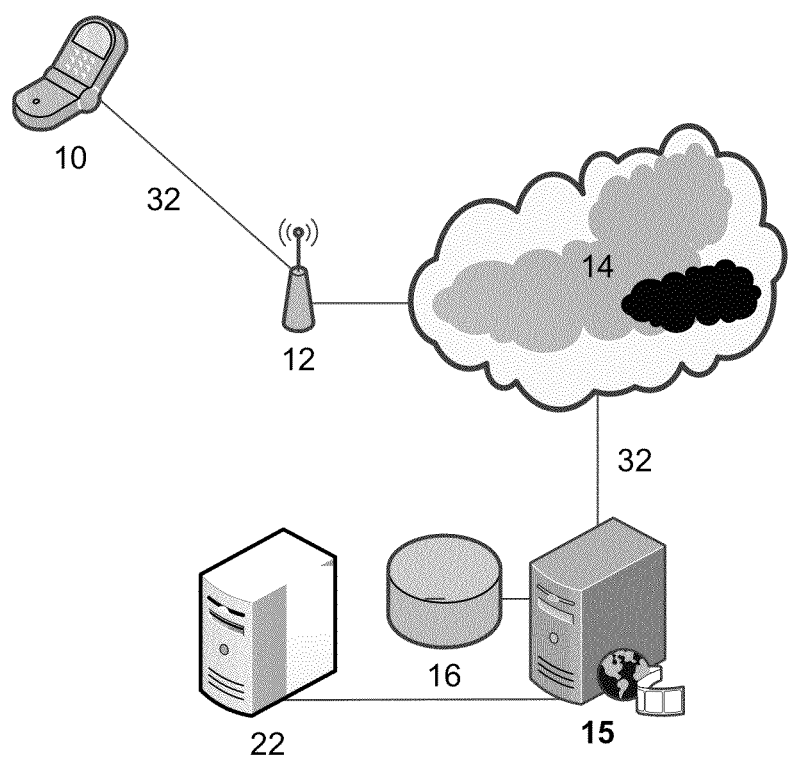
FIG. 2 is a diagram network for deploying an interactive display response (IDR) system in accordance with another embodiment of the invention.

FIG. 2 shows a non-limiting diagram of a network for deploying an interactive display response (IDR) system in accordance with another embodiment of the invention. In this embodiment, the IDA 10 and IDS 15 implement a unified display response (UDR) without any integration with IVR services. Accordingly, menus and graphical prompts are displayed on the mobile device executing the IDA 10 according to data transferred from the UDR 22 via the IDS 15. A selection of a control on the mobile device (e.g., menu button) is sent to the IDS 15, with a request to get the next display. It should be appreciated that such embodiment allows interacting with a web site containing information for customers. The information is displayed not in a form of web-pages, but rather as GUI that display messages responsive to user selections.

A connection from the mobile device executing the IDA 10 and the IDS 15 is through one or more of networks 11, 12, and 14, which may be any combination of IP network, LAN, and cellular network. The IDA 10 and IDS 15 exchange messages in a format of IDL over IPC 32 as described in detail above. Specifically, the IDS 15 receives requests from the IDA 10 through IPC 32, processes the requests, and sends, visual menus to IDA 10 responsive to the processed requests. IDA 10 sends the user's selections to the scripts using post IPC massages.

Figure 3:
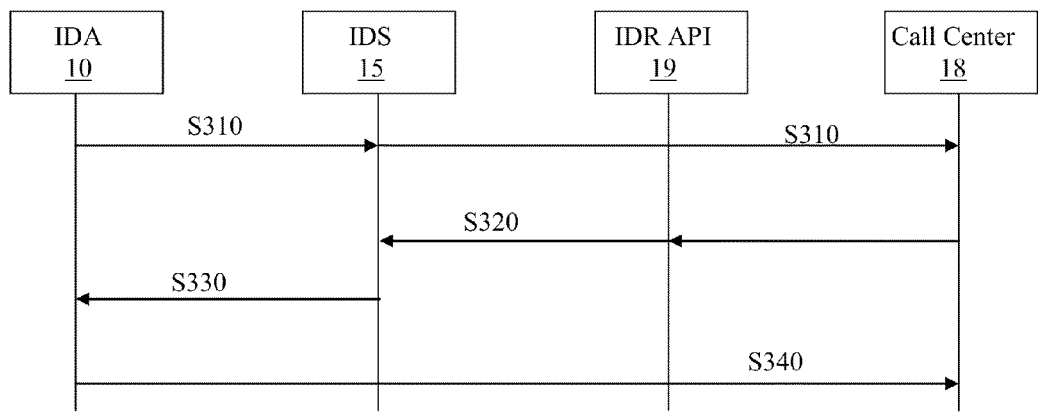
FIG. 3 is a flow diagram illustrating the operation of the IDR system in accordance with an embodiment of the invention.

FIG. 3 shows an exemplary and non-limiting flow diagram illustrating the operation of the IDR system in accordance with an embodiment of the invention. In the embodiment, messages are displayed on a mobile device running the IDA 10 responsive to an IVR script of the call center.

At S310, the IDA 10 dials the call center 18 via a cellular network and simultaneously connects to the IDS 15 via the IP network. That is, a voice session is opened with the call center and data session is established with the call center. It should be noted that the data session with the IDS 15 is opened only when the call center 18 is subscribed to provide IDR services. With this aim, when the IDA 10 dials the number of the call center 18, the IDA 10 checks if IDR services should be provided, and if so a connection is established with the IDA 10. At S320, the call center 18 accesses the IDS 15 via the IDR API 19 with the data to be displayed on the IDA 10. The data is generated by the contact center's 18 IVR script and may include data retrieved from CRM\ERP servers. At S330, the IDS 15 sends to the IDA 10 information to be displayed on the mobile device. In addition, the IDA 10 may be directed by the IDL commend to collect data from multiple sources, such as e-commerce servers, streaming media servers, and the like. Data retrieved from such resources can be displayed together with the messages received from the IDS 15. For example, the IDA 10 can generate a display that includes a text promoting the user to enter his account number together with an advertisement downloaded from an e-commerce server. At S340, the user input, i.e., the user selection is sent from the IDA 10 to the call center 18 over the voice session by using DTMF. In addition, the IDA 10 can also send data such as text message (e.g., SMS, MMS, and the like) to the call center 18 through the IDS 15 over the data session.

It should be noted that anytime during an active session between the IDA 10 and the call center 19, the call can be transferred to an attendant. The attendant can communicate with the user of the mobile device over the data session established with the IDS 15 and IDA 10. For example, the attendant can send to the IDA 10 messages in formats including, but not limited to, short message service (SMS) messages, email messages, multimedia messaging service (MMS) messages, images, video clips, audio clips, any combination thereof, and the like. It should be further noted, that as the user and the attendant can exchange messages, a chat session can be established between the two parties. An attendant can participate in chat session with multiple users.

Figure 4:
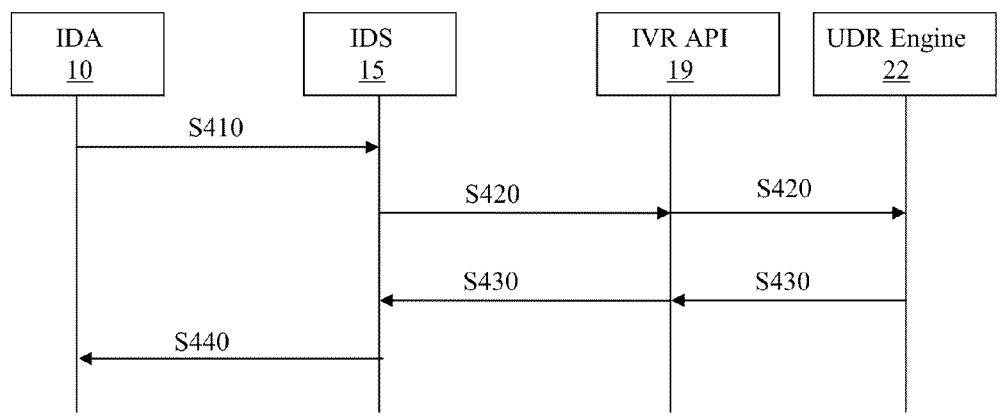
FIG. 4 is a flow diagram illustrating the operation of the IDR system in accordance with another embodiment of the invention.

FIG. 4 shows an exemplary and non-limiting flow diagram illustrating the operation of the IDR system in accordance with an embodiment of the invention. In the embodiment, messages are displayed on a mobile device running the IDA 10 responsive to an IVR script of the call center.

At S410, the IDA 10 connects to the IDS 15 via the IP network. At S420, the IDS 15 accesses a UDR engine 22, via the IDR IP 19, to retrieve data to be displayed. The UDR engine 22 implements a state machine that provides the updated screen to be displayed based on the recent user's selection. The UDR engine 22 can collect information from CRM\ERP servers and/or web sites (not shown). At S430, data from the UDR engine 22 is sent to the IDS 15. At S440, the IDS 15 sends to the IDA 10 information to be displayed on the mobile device. In addition, the IDA 10 may collect data from multiple sources, such as e-commerce servers, streaming media servers, and the like. Data retrieved from such resources can be displayed together with messages received from the IDS 15.

In accordance with an embodiment of the invention, the IDR system can be utilized to provide IDR services for people with disabilities. The Americans with Disabilities Act (ADA) requires business, Service providers, and government agencies to offer the same services to the disabled as to all of the population. The purpose of the IDR system is to provide equal access to information for the hearing impaired and persons suffering from ADD\ADHD as provided to the rest of the population. With this aim, the IDR system serves as a bridge between the service provider users' mobile device. Using the process described, the content of an IVR script is displayed on the users' mobile devices using the IDA 10, IDS 15, and IDR API 19. Thus, each call flow can be identical to the hearing impaired and non-hearing impaired. In addition, individuals suffering from concentration disabilities who cannot communicate with an IVR, can interact with the call center using a graphical interface. Such implementation would comply with Sections 255 and 251(a)(2) of the US Federal Law.

Figure 5:
FIG. 5 is an illustration of a display containing a cruise control feature.

In accordance with an embodiment of the invention, a cruise control is provided. The cruise control is a shortcut to a location within the flow of the IVR or IDR. That is, the user can select an entry in the menu without going back to the main menu all over again. As illustrated in FIG. 5, there are two types of cruise control menus: recently selected and top selections. According to this embodiment, the user's last selections for each call center are saved by the IDS 15 in the database 16. The selection refers to the last place in the call flow the user has reached in a single call. The Recently Selected menu is generated by the IDA 10 using this data and displayed over the mobile device.

In addition, the IDS 15 accumulates the selections made by all users calling to a certain call center. Using the accumulated selections, the Top Selections menu is generated by the IDA 10 and displayed over the mobile device.

In certain embodiments of the invention, the IDA 10 may generate controls in the form of images, in which each control represents a common entity or task. For example, as illustrated in FIG. 5, there are 3 images that are controls to access "Customer-Service", "Marketing", "Sales" departments in the company. In addition, a display's title is provided for each displayed screen. The title is displayed in order to simplify the use of the invention and state the current location of the user within the flow. As shown in FIG. 5 the instruction "Please select the required service" is the title for the display offering navigation to "Customer-Service", "Marketing", "Sales" departments. The title settings, such as font, language, color and more are configurable.

As mentioned above the IDA 10 interacts with the IDS 15 in a fully asynchronous communication over an IP network. This method of communication enables the IDA 10 to communicate with several IDSs 15 and web services in parallel without any interruption. In such way, advertisements and commercial content can be pushed to the mobile devices from various sources and content providers while the IDR menus and prompts are being displayed. The advertisements may be displayed in an information bar, as shown in the last figure on the top of the display. The information bar can be located at different areas of the display.

In accordance with an embodiment of the invention, the IDR system can be utilized to collect users' selections made during calls to call centers. Such information can be processed to produce demographic data about the user. Demographic data can be gathered from such as databases maintained by service providers.

Based on the demographic data targeted commercial content (e.g., ads) can be sent to the users. The invention may further track of the user's active interest in the displayed commercial content. In addition, based on the demographic data the type and design of controls is determined. For example, different controls could be used when targeting different groups of impaired and disabled population, language of the displayed content, and so on.

Figure 6:
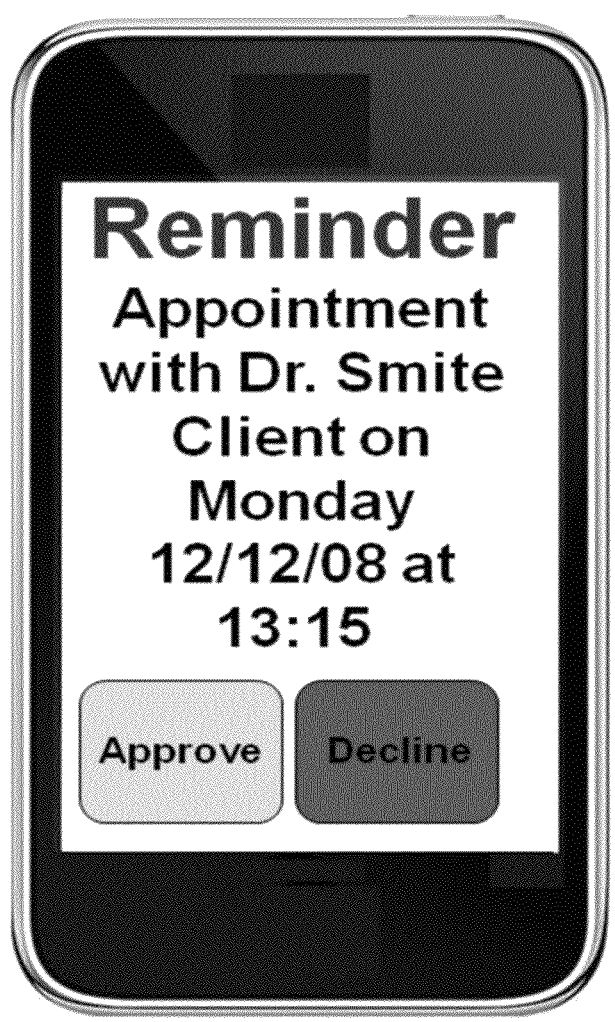
FIG. 6 is an illustration of a visual reminder.

In accordance with an embodiment of the invention, the IDR system can be utilized to provide send reminders to users. In this embodiment, users can receive visual reminders (e.g., reminders on upcoming appointments or scheduled events) to their mobile devices using the IDR system. The IDS 15 generates a message that is translated to a visual reminder by the IDA 10. An illustration of a visual reminder is provided in FIG. 6. The visual reminder includes the relevant details of the scheduled meeting/appointment. The reminders are uploaded by service providers to the database 16. The IDR system may also generate a report including messages that were sent, date and time of submission, and the feedback received from the user.

Figure 7A:
FIGS. 7A, 7B and 7C are example for screen layouts designed using the display builder.
Figure 7B:
Figure 7C:

In accordance with an embodiment of the invention, a display builder tool is provided. The display builder is utilized to render a customized design for a display screen. The displays are determined by call center scripts (or UDR scripts). The information is "pushed" to the IDA 10 using the IDL. To render a non-standard screen layout, the script designer can use the display builder to design such a layout. According to this embodiment, a drawing facilitating distinctive colors and unique screen item positions (title, icons, buttons, commercial content etc.) is created. Then, the display builder converts the drawing to IDL representation. Since mobile devices vary in display capabilities, the display builder contains simulator and adjustment tools. The designer is able to see how a screen is supposed to look on different devices and make the necessary changes. A light text only version of a display design can be made for use on older or limited devices. Examples for different screen layouts generated using the display builder is provided in FIGS. 7A, 7B, and 7C. The illustration in FIG. 7C demonstrates how a simple device may present the complex layout shown in 7B.

Figure 8:
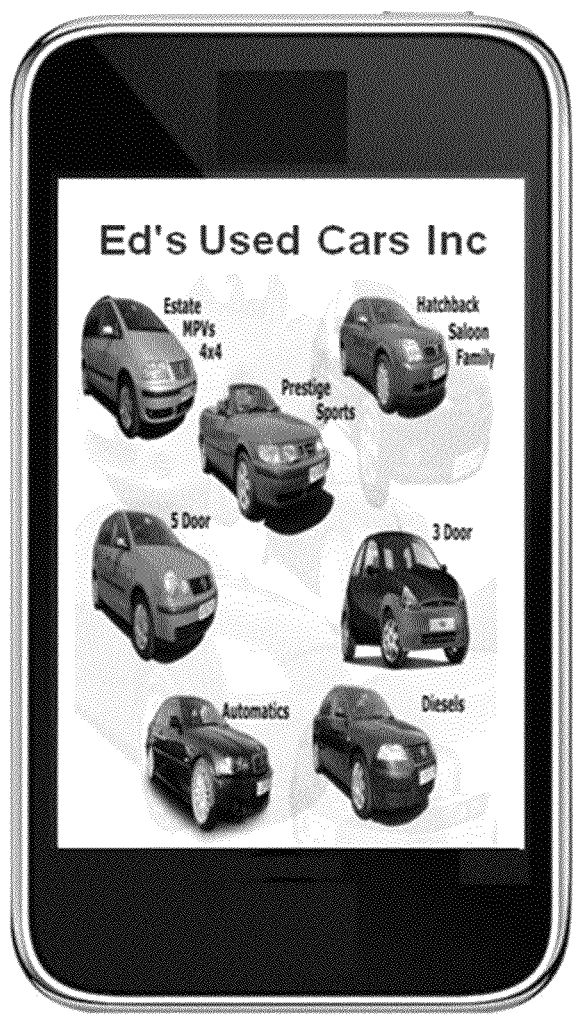
FIG. 8 is an illustration of a graphical product display.

FIG. 8 illustrates a graphical product display generated in accordance with an embodiment of the invention. The graphical product display allows customers to view products for sale on their devices using the IDR system. Once an inbound session for the IDA 10 reaches the IDS 15, the IDS 15 loads from the business provider database the required data to display onto the calling device. Upon selection of a preferred product, the selection is sent from the IDA 10 to the IDS 15 to a business provider's database. Upon a business provider's approval, the IDS 15 submits a visual approval notification to the end user's IDA 10 regarding the relevant selection. This service allows any business to display their goods visually, to any potential customers by providing the end user with a fully colorful vivid image of their goods on the user's mobile device.

It should be apparent to one skilled in the art, that other services can be developed or provided by the IDR system disclosed herein. For example, the IDR system allows users to search within various lists that are provided by service providers, such as lists of names, departments, services, and so on. This allows to "flattening" the logic of the call center, i.e., provide more direct action rather than menu-by-menu convergence to a selection. Search is provided in several ways including, but not limited to, letter-by-letter list filtering, list browsing and more. Another example is a service for scheduling appointments. The user can call to an IDR integrated call center and receive a visual calendar to be displayed on his/her mobile device. Using that display, the end user can schedule an appointment. Yet as another example is a mobile surveys and polls service adapted to collect and obtain data from customers by the IDR system. The pool is uploaded to the database 16 and sent to user via the IDS 15 and IDA 10 according to a predefined script. The IDS 15 collects the pool results and generates a report.

The principles of the invention can be implemented as hardware, firmware, software or any combination thereof. Moreover, the software is preferably implemented as an application program tangibly embodied on a program storage unit, a non-transitory, computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. An interactive display response (IDR) system, comprising:
    an interactive display server (IDS) for communicating display request from a call center to a plurality of mobile devices attempting to establish a connection with the call center, wherein the display requests are generated respective of one of the call flows implemented by the call center, wherein the IDS is further configured to transfer the graphical displays to an interactive display agent (IDA) installed on a mobile device which established a connection with the IDS, wherein the connection with the IDS is established over a data session when the call center is subscribed to provide IDR services; and
    a unified display response (UDR) for generating unified graphical displays respective of the display requests.

2. The IDR system of claim 1, wherein the UDR is further configured to receive a selection from the IDA and generates a new graphic display responsive of the selection of the control.

3. The IDR system of claim 2, wherein the UDR is further configured to buffer received selections prior to transmitting the selection to the IDS.

4. The IDR system of claim 3, wherein the buffered selections are transmitted to the call center through the IDS over the data session.

5. The IDR system of claim 4, wherein the buffered selections are transmitted to the call center through the IDA using dual-tone multi-frequency (DTMF) signaling.

6. The IDR system of claim 5, wherein the IDS acts as a registrar for the plurality of mobile devices, wherein each of the plurality of registered mobile device executes an IDA and is saved in the database.

7. The IDR system of claim 1, wherein one of the call flows includes any one of: a pre-call flow, an in-call flow, and a post-call flow.

8. The IDR system of claim 1, further comprises a database connected to the IDS.

9. A method for providing interactive display response (IDR) services, comprising:

establishing a voice session between a mobile device and a call center;

establishing a data session between the mobile device and an interactive display server (IDS), wherein the IDS communicates with the call center via an IDR interface;

generating display requests based on a call flow of a call center and top selections of a user of the mobile device; and sending the display requests to the mobile device over the data session to allow the display of the display requests on the mobile device.

10. The method of claim 9, wherein the top selections of a user of the mobile device are determined based on previous interactions of the user with the call center.

11. The method of claim 10, wherein the top selections further include at least one of: personal information about the user and technical information about the mobile device.

12. The method of claim 11, wherein the display requests provide a shortcut to a location within a call flow of the call center.

13. The method of claim 11, wherein, the call flow includes any one of: a pre-call flow, an in-call flow, a post-call flow, and an input provided by a call center agent.

14. The method of claim 13, wherein the input from the call center agent can be received during at least one of: during the call and after the call.

15. The method of claim 14, wherein the input includes screens to be displayed during various stages of the call flow.

16. The method of claim 14, wherein the screens include commercial content.

17. The method of claim 14, wherein the set of commands further includes screens that encapsulate information provided by an agent of the call center during various stages of the call flow.

18. A non-transitory computer readable medium having stored thereon instructions for causing one or more processing units to execute the method according to claim 9.

* * * * *